UNITED STATES PATENT OFFICE.

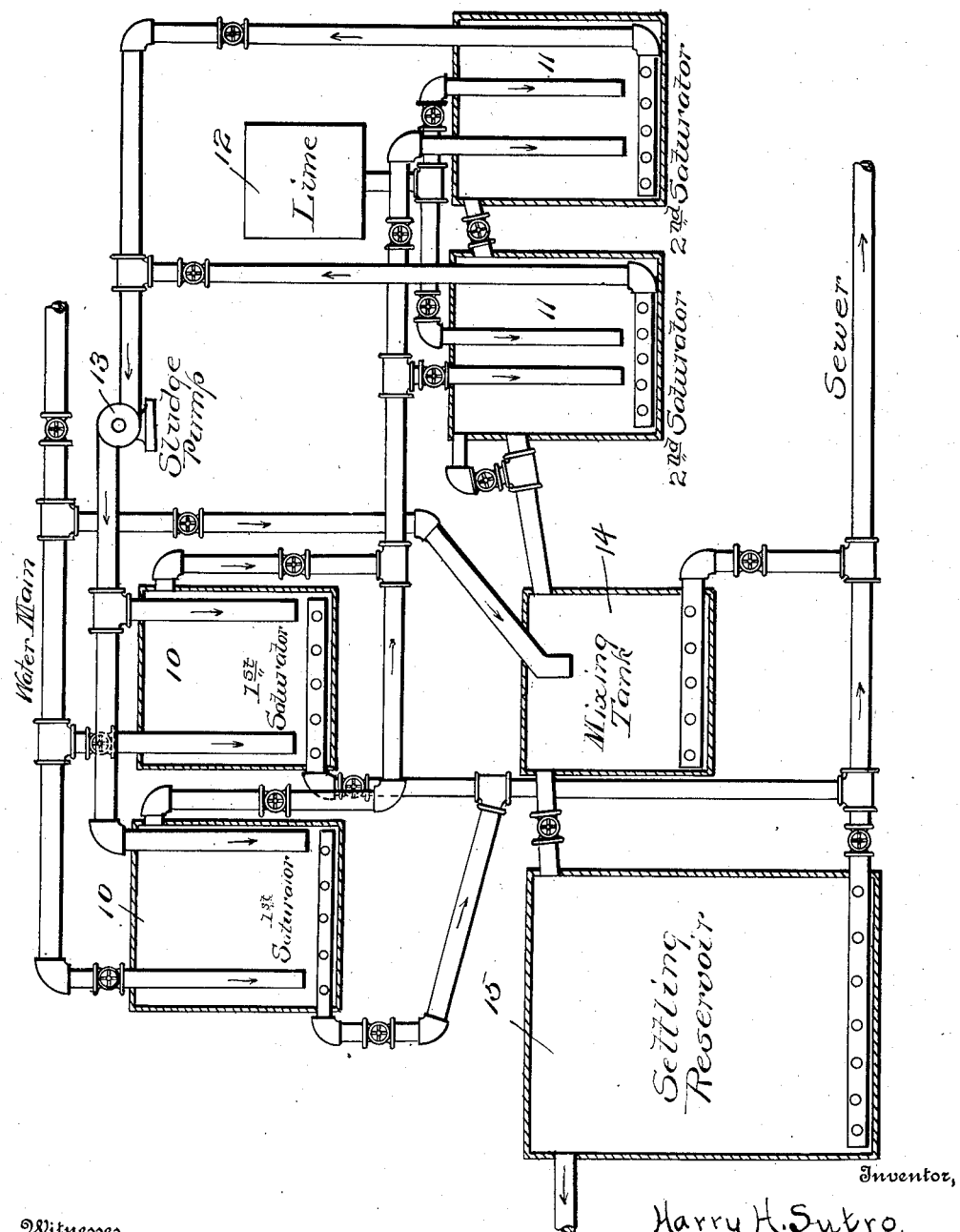

HARRY H. SUTRO, OF NEW YORK, N. Y.

PROCESS FOR PRODUCING SATURATED LIME-WATER.

973,992.　　　　Specification of Letters Patent.　　Patented Oct. 25, 1910.

Application filed April 12, 1907. Serial No. 367,839.

*To all whom it may concern:*

Be it known that I, HARRY H. SUTRO, a citizen of the United States, residing at New York, in the county of New York and State of New York, have invented certain new and useful Improvements in Processes for Producing Saturated Lime-Water; and I do hereby declare the following to be a full, clear, and exact description of the invention, such as will enable others skilled in the art to which it appertains to make and use the same.

This invention relates to a process for treating water and other liquids, and has for an object to provide improved steps for an economical use of the reagents.

A further object of the invention is to provide in a water treating system, especially a system for softening water, means for more completely exhausting the chemical reagents applied to the water.

A further object of the invention is to provide in a liquid treating system improved steps for subjecting the liquid to the action of a reagent by which submission a portion of the reagent is exhausted and then applying the partially exhausted reagent to a preliminary treatment of the liquid.

A further object of the invention is to saturate a liquid, as water, with any predetermined chemical reagent as lime, and to remove and reuse the precipitate containing some unexhausted reagent and re-applying such removed precipitate to a preliminary saturation of the liquid treated.

In the process of purifying water it is ordinarily customary to divide the water to be treated and to saturate a small percentage of the water with lime or other difficultly soluble chemical and after thoroughly mixing the reagent with the small percentage of the water to again combine the small percentage of the water with the main body of the water, and to thoroughly mix the combined waters and permit precipitation.

To carry out the process above described any convenient and improved form of saturators are employed, as tanks, reservoirs, ponds or other approved and convenient receptacles, and after employing the saturators to saturate the small percentage of the water named, the water so saturated is conducted into other receptacles or settling basins which may be of any approved form, size or material, as above described or different. To thoroughly saturate the small percentage of the water with the reagent it becomes practically necessary to apply thereto a greater amount of the reagent than sufficient to saturate the water, and a certain amount of the reagent is therefore present in the reagent tank, or saturator, in an unexhausted or only partially exhausted condition. This unexhausted reagent, together with certain insoluble particles of the reagent itself and some of the impurities of the water are ordinarily flushed out of the saturator, as sludge, into a sewer or other drainage system, and the chemical values of the reagent and the strong reagent solution used to flush it out of the saturator, are, therefore, lost and wasted.

The present invention is well adapted for use in connection with a continuous process of water softening and purification, and consists in removing the sludge or precipitate above described from the bottom of the saturator and treating therewith the water in a preliminary saturator, whereby the unexhausted values of the reagents being applied to fresh unsaturated water are more readily and completely removed from such precipitate. From the preliminary saturator the water is led into the ordinary saturator and is there treated with the lime in the usual and ordinary manner. It is from this ordinary saturator that the precipitate is withdrawn, and applied to the preliminary saturator.

The drawing represents a diagrammatic or conventional apparatus by which the present invention may be carried into effect it being understood, however, that the said apparatus is only one of a very large variety of apparatuses by which the invention may be accomplished.

It will, therefore, be seen that in the course of its conversion into saturated lime water, the raw water passes first through the preliminary saturator 10, and is subjected to treatment by the waste materials or sludge from the ordinary saturator 11 from which it leaches out all reagent values, but owing to the decreasing amount of reagent value contained in said material, the water issuing from the said preliminary saturator is seldom, if ever, saturated. To insure its complete conversion into saturated lime water (saturated lime water possessing certain advantages in water softening processes), it is, therefore, passed through the second or ordinary saturator 11 and therein supplied with a fresh charge of the reagent from the tank 12. When the material applied to the water in the preliminary saturator 10 has been entirely exhausted of its reagent values, the remaining insoluble portions, precipitates and sludges are flushed out of the preliminary saturator into the sewer or other drainage system. Meanwhile the fresh charge of lime in the ordinary saturator 11 has been partially exhausted. It is now transferred from the ordinary saturator 11 to the preliminary saturator 10 by any approved means as the sludge pump 13 and a fresh charge of lime is placed in the ordinary saturator from the tank 12.

It will be seen that there is necessary to this process a plurality of saturators including the usual and ordinary saturators, and one or more preliminary saturators. The preliminary saturator, according to the present invention, is preferably never supplied directly with the fresh reagents, the only reagent introduced into the said preliminary saturator or saturators being that admixed with the waste material from the ordinary saturator, while the lime reagent is applied from time to time to the ordinary saturators and to the water or liquid therein contained which may come wholly or in part from the preliminary saturator.

While the process as above described may be applicable to the treatment of any liquid with any precipitating reagent, it is especially designed and intended for use in the treatment of water with lime or calcium hydroxid as the reagent, and is designed for purifying the water.

In the production of saturated lime water for water purification, it is advantageous to pass water upward through the difficultly soluble reagent at such a rate of flow that little, if any, undissolved reagent is carried away by the water. If desired, the reagent may be mechanically mixed with the water by any suitable device.

In the drawing a mixing tank 14 is shown into which the saturated lime water is conducted from the saturators 11 and also a settling tank 15 from which the combined lime water and water from the main are permitted to settle to precipitate the impurities of the water together with the lime introduced. The mixing tank while shown as provided with means for removing the sludge is not intended in any manner as a settling tank but it is found in use that a certain amount of impurities will be thrown down in this tank, and means are provided for removing the same. Means is also provided in the first saturator 10 for removing sludge and other precipitates and conducting it to the sewer, such precipitates being the exhausted lime and impurities which have been transferred from the second saturator 11 by means of the sludge pump into the first saturator 10 and there exhausted of their active properties.

The present invention is the process of producing the saturated lime water and not of purifying, as the process is known to be old of admixing saturated lime water with water from the mains and permitting such mixture to precipitate its impurities.

The present invention consists particularly in employing one or more saturators to which lime or other re-agent materials are added in quantities in excess of the amount to saturate the water. The reason for this is that it is desirable to completely saturate the water and unless an excess amount of the re-agent is added a complete saturation is not accomplished. The excess of the re-agent is then withdrawn from the second saturator and conducted by means of a sludge pump or otherwise to the first saturator which therein meets untreated water from the mains which absorbs the active properties of the partially exhausted re-agent material. By this means all of the active properties of the re-agent is exhausted.

What I claim is:—

1. The process of treating water consisting in employing a plurality of saturators, treating the water in one saturator with lime in excess of saturation to cause a precipitation, withdrawing the sludge from the saturator with the excess lime, conveying it to the other saturator, introducing fresh water to the last-mentioned saturator to dissolve the lime remaining in the sludge, conveying the partially saturated water to the first-mentioned saturator for further saturation by fresh lime, and discharging the sludge from the saturator which receives the raw water.

2. The process of treating water consisting in introducing water into a saturator, treating the water in such saturator with a mixture of sludge and unconsumed lime to partially saturate the water, conveying the partially saturated water to a second saturator, and treating the water in the second saturator to lime in excess of that required for saturation.

In testimony whereof I affix my signature in presence of two witnesses.

HARRY H. SUTRO.

Witnesses:
L. W. BOOTH,
H. M. THOMPSON.